(12) United States Patent
Bordawekar

(10) Patent No.: US 12,141,114 B2
(45) Date of Patent: Nov. 12, 2024

(54) SEMANTIC INDICES FOR ACCELERATING SEMANTIC QUERIES ON DATABASES

(71) Applicant: International Business Machines Corporation, Armonk, NY (US)

(72) Inventor: Rajesh Bordawekar, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/546,343

(22) Filed: Dec. 9, 2021

(65) Prior Publication Data

US 2023/0185788 A1 Jun. 15, 2023

(51) Int. Cl.
| G06F 16/00 | (2019.01) |
| G06F 16/22 | (2019.01) |
| G06F 16/242 | (2019.01) |
| G06N 3/008 | (2023.01) |

(52) U.S. Cl.
CPC ........ *G06F 16/2228* (2019.01); *G06F 16/243* (2019.01); *G06N 3/008* (2013.01)

(58) Field of Classification Search
None
See application file for complete search history.

(56) References Cited

U.S. PATENT DOCUMENTS

| 5,548,749 A | 8/1996 | Korenke |
| 6,169,990 B1 | 1/2001 | McGregor |
| 6,363,373 B1 | 3/2002 | Steinkraus |
| 6,470,306 B1 | 10/2002 | Pringle |
| 7,158,961 B1 * | 1/2007 | Charikar ............. G06F 16/3347 707/E17.08 |
| 7,827,170 B1 | 11/2010 | Horling |
| 8,190,555 B2 | 5/2012 | Venugopal |
| 8,244,767 B2 | 8/2012 | Ancin |
| 9,454,524 B1 | 9/2016 | Modani |
| 9,690,848 B2 | 6/2017 | Thollot |
| 10,068,154 B2 | 9/2018 | Prest |
| 10,097,204 B1 | 10/2018 | Huang |

(Continued)

FOREIGN PATENT DOCUMENTS

| CN | 1055311706 | 4/2016 |
| CN | 109062939 A | 12/2018 |

(Continued)

OTHER PUBLICATIONS

Prosecution History for U.S. Appl. No. 16/238,231.

(Continued)

*Primary Examiner* — Thu Nguyet T Le
(74) *Attorney, Agent, or Firm* — Daniel J Blabolil

(57) ABSTRACT

A computer-implemented method accelerates cognitive intelligence queries to a database using semantic keys. A computing device receives a database. The computing device inserts one or more key-value pairs into the database, where the key is a semantic key that is generated from a binary codeword built from a locality sensitive hashing of one or more vectors in a database embedding model of the database, and where the value is a tuple in the database that identifies entries in the database that share predefined features. The computing device uses the one or more key-value pairs for accelerating cognitive intelligence queries to the database.

20 Claims, 10 Drawing Sheets

(56) References Cited

U.S. PATENT DOCUMENTS

| | | | |
|---|---|---|---|
| 10,229,200 | B2 | 3/2019 | Bornea |
| 10,572,544 | B1 | 2/2020 | Zhang |
| 2004/0117189 | A1 | 6/2004 | Bennett |
| 2005/0027717 | A1 | 2/2005 | Koudas |
| 2006/0173834 | A1 | 8/2006 | Brill |
| 2007/0185900 | A1 | 8/2007 | Gadamsetty |
| 2009/0164427 | A1 | 6/2009 | Shields |
| 2009/0216755 | A1 | 8/2009 | Itamar |
| 2010/0312769 | A1 | 12/2010 | Bailey |
| 2011/0035656 | A1 | 2/2011 | King |
| 2011/0125578 | A1 | 5/2011 | Alspector |
| 2012/0143793 | A1 | 6/2012 | Bowers et al. |
| 2013/0007001 | A1 | 1/2013 | Komedani |
| 2013/0304740 | A1 | 11/2013 | Botros |
| 2014/0164036 | A1 | 6/2014 | Prieto |
| 2014/0337383 | A1 | 11/2014 | Boyle |
| 2015/0026145 | A1 | 1/2015 | Gupta |
| 2015/0026153 | A1 | 1/2015 | Gupta |
| 2015/0052084 | A1 | 2/2015 | Kolluru et al. |
| 2015/0186739 | A1 | 7/2015 | Lindsay |
| 2015/0220597 | A1 | 8/2015 | Simhadri |
| 2015/0293946 | A1 | 10/2015 | Fong |
| 2015/0331846 | A1 | 11/2015 | Guggilla |
| 2016/0004667 | A1 | 1/2016 | Chakerian |
| 2016/0062979 | A1 | 3/2016 | Mote |
| 2016/0063357 | A1 | 3/2016 | Gao |
| 2016/0117361 | A1 | 4/2016 | Boyle |
| 2016/0203422 | A1 | 7/2016 | Demarchi et al. |
| 2016/0291156 | A1 | 10/2016 | Hjelmstad |
| 2016/0371247 | A1 | 12/2016 | Boxwell |
| 2016/0371253 | A1 | 12/2016 | Boxwell |
| 2017/0060903 | A1 | 3/2017 | Pendar |
| 2017/0060993 | A1 | 3/2017 | Pendar |
| 2017/0076226 | A1 | 3/2017 | Allen |
| 2017/0109355 | A1 | 4/2017 | Li |
| 2017/0139984 | A1* | 5/2017 | Bordawekar ............ G06N 5/02 |
| 2017/0154314 | A1 | 6/2017 | Mones |
| 2017/0161396 | A1 | 6/2017 | Hassanzadeh |
| 2017/0177712 | A1 | 6/2017 | Kopru |
| 2017/0308613 | A1 | 10/2017 | Zhu et al. |
| 2017/0309194 | A1 | 10/2017 | Simske |
| 2018/0011927 | A1 | 1/2018 | Lee et al. |
| 2018/0068371 | A1 | 3/2018 | Krishnamurthy et al. |
| 2018/0114144 | A1 | 4/2018 | Miranda |
| 2018/0165362 | A1 | 6/2018 | Engelko |
| 2018/0173803 | A1 | 6/2018 | Grover |
| 2018/0240026 | A1 | 9/2018 | Pietrobon |
| 2018/0267977 | A1 | 9/2018 | Bandyopadhyay |
| 2018/0268024 | A1 | 9/2018 | Bandyopadhyay |
| 2018/0341630 | A1 | 11/2018 | Devries |
| 2019/0026389 | A1 | 1/2019 | Beller |
| 2019/0266257 | A1 | 8/2019 | Natchu |
| 2019/0278777 | A1 | 9/2019 | Malik |
| 2020/0265098 | A1* | 8/2020 | Tepper .................... G06F 18/22 |
| 2021/0026820 | A1* | 1/2021 | Mahajan ............... G06F 16/316 |

FOREIGN PATENT DOCUMENTS

| | | |
|---|---|---|
| CN | 109347801 B | 3/2021 |
| DE | 69419184 | 12/1999 |
| EP | 3022665 | 5/2017 |
| WO | 2015009353 | 1/2015 |

OTHER PUBLICATIONS

Prosecution History for U.S. Appl. No. 15/463,158.
Mell, et al.., "The NIST Definition of Cloud Computing", NIST, Sep. 2011.
Ravichandran et al., "Randomized algorithms and NLP: Using locality sensitive hash functions for high speed noun clustering." Proceedings of the 43rd Annual Meeting of the Association for Computational Linguistics (ACL'05). 2005.
Singh et al. "Capturing knowledge in semantically-typed relational patterns to enhance relation linking." Proceedings of the Knowledge Capture Conference. 2017.
Sutha et al., "Image Retrieval in Image Annotation Framework Using Relational Semantic Indexing." International Journal of Computer Science Trends and Technology (IJCST)—vol. 2 Issue 6, Nov.-Dec. 2014.
Zhu et al., "Integrating semantics-based access mechanisms with P2P file systems." Proceedings Third International Conference on Peer-to-Peer Computing (P2P2003). IEEE, 2003.
Other reference—Patent/Application/Search Documents May 10, 2022
Apache, Apache spark: a fast and general engine for large scale data processing, Dec. 28, 2016.
Bengio, "A neural probablistic language model", JMLR, Feb. 2003.
Bollegala et al-. "Embedding Semantic Relations into Word Representations," Proceedings of the Twenty-Fourth International Joint Conference on Artificial Intelligence (IJCAI), 2015, pp. 1222-1228.
Bordawekar et al., "Cognitive Database: A Step towards Endowing Relational Databases with Artificial Intelligence capabilities," arXiv, Dec. 19, 2017, pp. 1-14, retrieved from https://arxiv.org/pdf/1712 07199-pdf.
Bordawekar et al., Enabling Cognitive Intelligence Queries in Relational Databases using Low-dimensional Word embeddings, l' arXiv, Mar. 23, 2016, pp. 1-12, retrieved from https://arxiv.org/pdf/ 1603.07185-pdf.
Bordawekar et al., "Exploiting Latent Information in Relational Databases via Word Embedding and Application to degrees of Disclosure," Proceedings of 9th Biennial Conference on Innovation Data Systems Research (CIDR '1 9), Jan. 2019, pp. 1-6.
Bordawekar et al., "Using Word Embedding to Enable Semantic Queries in Relational Databases," Proceedings of 1st Workshop on Data Management for End-to-End Machine Learning (DEEM '17), May 14, 2017, 4 pages.
Cuzzocrea, "Searching semantic data warehouses: models, issues, architectures", SSW'12, 2nd International Workshop on Semantic Search over the Web, 2012.
DDM Ransinghe and AS Karunananda Qualitative Reasoning Engine for Visual Scene understanding in cognitive Vision Systmes, 2006 International conference on Information and Automation, Shandong, 2006.
Dreher et al ("Assisted query formulation using normalised word vector and dynamic ontological filtering", vol. 4027 LNAI, 2006, pp. 282-294, 7th International Conference on Flexible Query Answering Systems, FQAS 2006; Milan; Italy; Jun. 7, 2006 through Jul. 10, 2006; Code 67839).
GRay, "Data cube: A relational aggregation operator generalizing group by cross-tab and sub-totaqs", Data mining and knowledge discovery, 1997.
Hofford, G-, "Structure Logic: A New Method that Enables Richer Meaning Representations," IP.com Prior Art database Technical Disclosure No. IPCOM000235703D, Mar. 21, 2014, 447 pages.
Kerem et al., "Semantic Structure and Interpretability of Word Embeddings," IEEE/ACM Transactions on Audio, speech, and Language Processing, vol. 26, No. 10, Revised May 16, 2018, pp. 1-11, retrieved from https://arxiv.org/bs/1711.00331.
Luc De Raedt, A perspective on inductive databases, SIGKDD Explor.Newal Dec. 2002.
Pennington et al., "GloVe: Global Vectors for Word Representation," Proceedings of the 2014 Conference on mpirical Methods in Natural Language Processing (EMNLP), Oct. 25-29, 2014, pp. 1532-1543.
S. Garg, JE Nam, IV Ramakrishnan and K. Mueller, "Model-driven Visual Analytics", 2008 IEEE Symposium on Visual Analytics Science and Technology, 2008.
Prosecution History for U.S. Appl. No. 15/463,086.
Prosecution History for U.S. Appl. No. 15/463,179.
IBM "Transformation and mapping of textual data to relational data source entities," IP.com Prior Art Database, Technical Disclosure No. IPCOM000154480D, Jul. 2, 2007, pp. 1-10.
Ehrenreich, R, "System and Method for Automatically Generating Platform-Specific Database Code from Schema composed of Typed

(56) References Cited

OTHER PUBLICATIONS

Tables and Formulas," IP.com Prior Art Database, Technical Disclosure No. IPCOM000255833D, Oct. 16, 2018, 143.

Fernandez et al., "Seeping Semantics: Linking Datasets using Word Embeddings for Data Discovery," IEEE 34th International Conference on Data Engineering (ICDE), Apr. 16-19, 2018, 12 pages, retrieved from https://ieeexploreeee.org/documenV8509314.

CSRC, "Cloud Computing," Computer Security Resource Center, Oct. 2017, 3 pages, retrieved from https://csrcist-gov/projects/cloud-computing.

Mikolov et al., "Distributed Representations of Words and Phrases and their Compositionality," Proceedings of the 6th International Conference on Neural Information Processing Systems (NIPS), vol. 2, Dec. 5-10, 2013, pp. 9, retrieved from https://dl.acm.org/citation.cfm?id=2999959.

Neves et al., "Demonstrating Semantic SQL Queries over Relational Data using the AI-Powered Database," 1st International Workshop on Applied AI for Database Systems and Applications (AIDB '19), Aug. 26, 2019, pp. 1-12.

Prosecution History for U.S. Appl. No. 14/940,716.
Prosecution History for U.S. Appl. No. 15/463,053.
Prosecution History for U.S. Appl. No. 16/665,364.

* cited by examiner

SEMANTIC INDICES FOR ACCELERATING SEMANTIC QUERIES ON DATABASES

BACKGROUND

One or more embodiments of the present invention relates to cognitive responses to database queries. Still more specifically, one or more embodiments of the present invention relates to accelerating responses to database queries by using semantic descriptors of data in databases.

Prior art databases, including relational databases, sort and return data according to entries whose meanings are self-explicit. That is, if a user requests data from a prior art database related to all entities having the name "Company A" or that are located in "City X" or that have annual sales over $500,000, then a query engine (e.g., a structured query language—SQL query) will look for such data so labeled, and will return the rows that include that data. The data being requested and stored has no inferred meaning, only explicit meaning (e.g., "Name", "Location", "Revenue", etc.).

As such, the prior art does not present an efficient and rapid way to retrieve data from a database by the semantic meaning of data, as defined by other data stored in the database.

SUMMARY

In one or more embodiments of the present invention, a method uses a computing device to accelerate cognitive intelligence queries. A computing device receives a database. The computing device inserts one or more key-value pairs into the database, where the key is a semantic key that is generated from a binary codeword built from a locality sensitive hashing of one or more vectors in a database embedding model of the database, and where the value is a tuple in the database that identifies entries in the database that share predefined features. The computing device uses the one or more key-value pairs for accelerating cognitive intelligence queries to the database.

In one or more embodiments of the present invention, the computing device generates an inverse index of rows in the database, where the inverse index identifies a token identifier and a row identifier for one or more rows in the database. The token identifier identifies a particular type of data entry according to a semantic index of a particular row in the database, and the row identifier identifies a particular row in the database that includes the particular type of data entry. The computing device identifies rows in the database in the inverse index of rows that share a same token identifier, and uses row identifiers for identified rows in the database in the inverse index of rows that share the same token identifier to respond to a request for data that comprises the particular type of entry.

In one or more embodiments of the present invention, the method(s) described herein are performed by an execution of a computer program product on a computer system.

DETAILED DESCRIPTION

As described herein, one or more embodiments of the present invention present a new and useful artificial intelligence (AI) powered database that uses semantic word vector representations of relational entities to enable a new kind of semantic queries (Cognitive Intelligence Queries), including but not limited to structured query language (SQL) queries. That is, presented herein and in one or more embodiments of the present invention is a system that enables cognitive intelligence (CI) queries that utilize semantic, not value, based operations on the databases, including but not limited to relational databases.

One or more embodiments of the present invention utilize value-based index structures, such as B-trees, to improve access performance of relational data by utilizing a semantic index that provide fast access to semantically similar items that can be used candidate set of evaluating the CI query.

Figure 1:
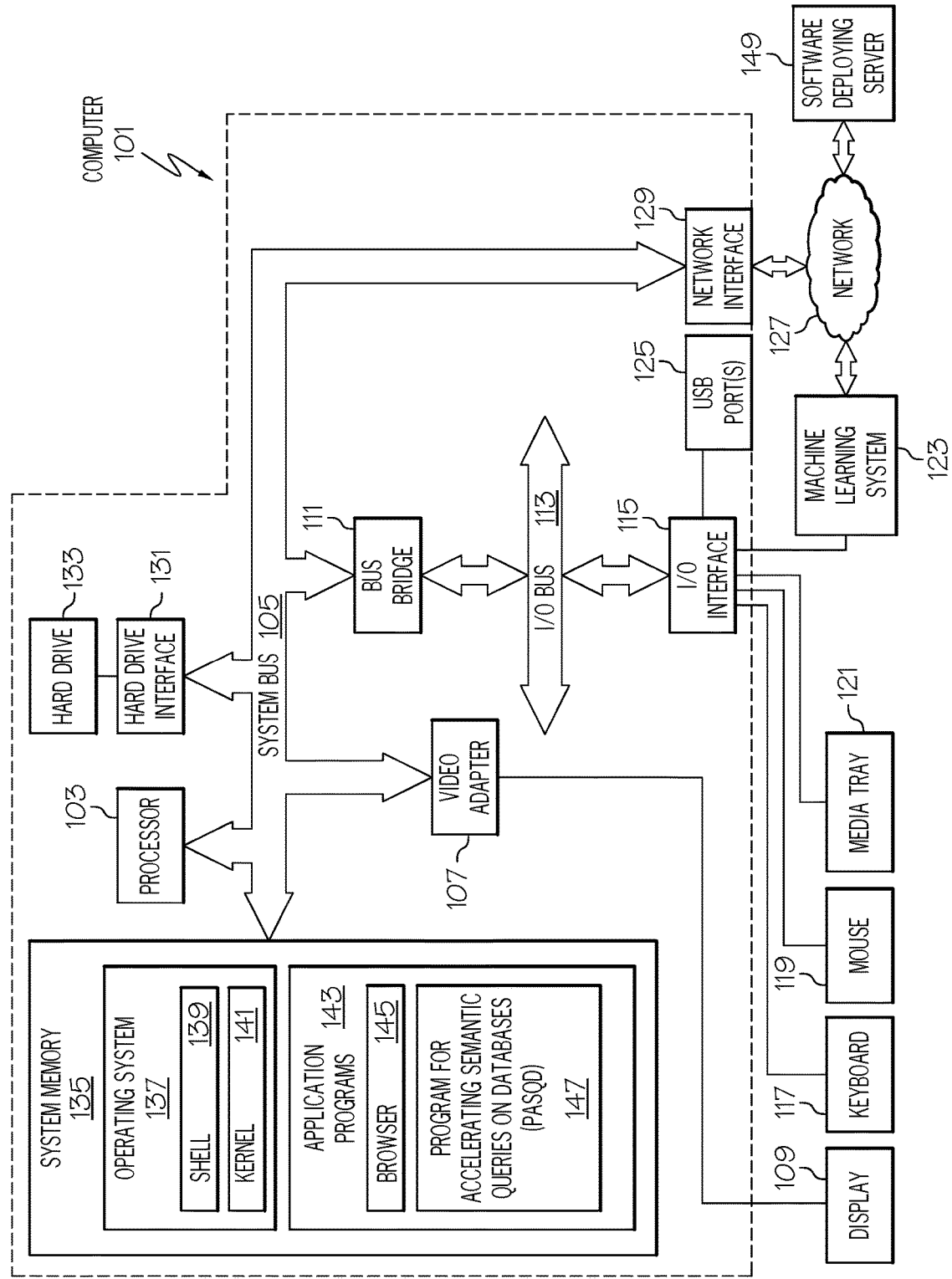
FIG. 1 depicts an exemplary system and network in which the present disclosure is implemented in one or more embodiments of the present invention.

With reference now to FIG. 1, there is depicted a block diagram of an exemplary system and network that is utilized by and/or in the implementation of one or more embodiments of the present invention. Note that some or all of the exemplary architecture, including both depicted hardware and software, shown for and within computer 101 are utilized by machine learning system 123 and/or software deploying server 149 shown in FIG. 1, and/or other processing devices depicted in other figures associated with one or more embodiments of the present invention.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113 I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a network 127 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135 which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, one or more embodiments of the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory also include a Program for Accelerating Semantic Queries on Databases (PASQD) 147. PASQD 147 includes code for implementing the processes described below, including those described in FIGS. 2-8. In one or more embodiments of the present invention, computer 101 is able to download PASQD 147 from software deploying server 149, including in an on-demand basis, wherein the code in PASQD 147 is not downloaded until needed for execution. Note further that, in one or more embodiments of the present invention, software deploying server 149 performs all of the functions associated with the present invention (including execution of PASQD 147), thus freeing computer 101 from having to use its own internal computing resources to execute PASQD 147.

Machine learning system 123 is an artificial intelligence (AI) system. Examples of machine learning system 123 include, but are not limited to in various embodiments of the present invention, neural networks (e.g., deep neural networks, recurrent neural networks, convolutional neural networks, graph neural networks, etc.), pattern matching systems, etc.

Note that the hardware elements depicted in computer 101 are not intended to be exhaustive, but rather are representative to highlight essential components required by one or more embodiments of the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
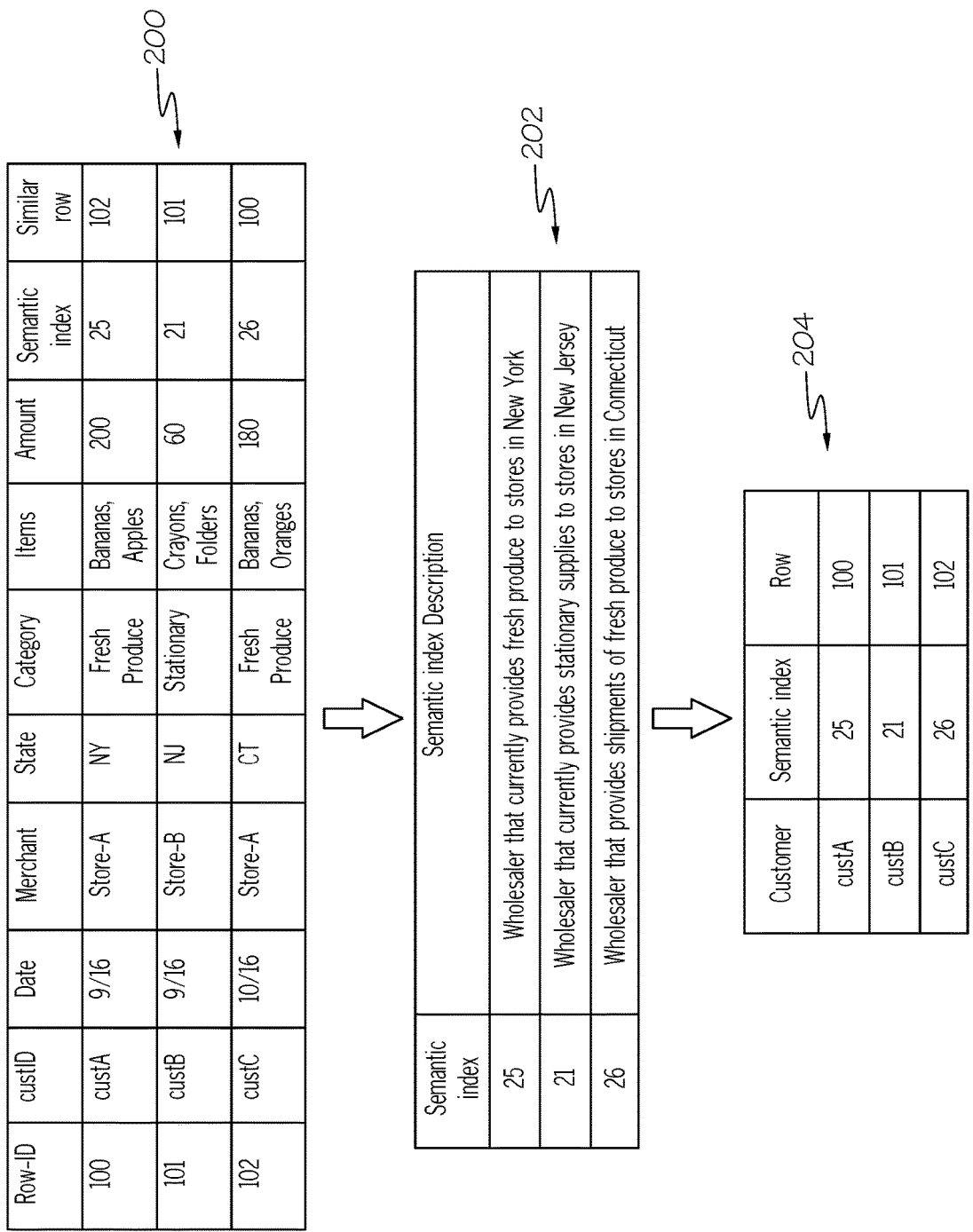
FIG. 2 illustrates an exemplary relational database and an inverted index thereof as used in one or more embodiments of the present invention.

With reference now to FIG. 2, an exemplary database 200 having a structure used in one or more embodiments of the present invention is presented.

As shown in FIG. 2, database 200 presents a database that utilizes an embedding table having tokens built from a relational table as keys and d-dimensional vectors as values, such that each row gets its own one or more semantic vectors. That is, data from columns such as "Merchant", "State", "Category", "Items", "Amount", etc. give a semantic meaning to data from one or more other columns (e.g., a particular customer such as "custA" that supplied fresh produce to "Store-A" on the date "September 16").

For example, assume that the system wants to define custA not by its name ("custA"), but rather what it does or has done. For example, and as shown in database 200, custA sold 200 units of bananas and apples (fresh produce) to Store-A in New York on September 16. This information from the database 200 semantically defines custA as a wholesaler who is currently providing large shipments of fresh produce to stores in New York. This semantic definition is converted into a semantic index "25", which is defined as meeting these criteria within the context shown in row 100, as shown in table 202.

Assume now that the system/user wants to define custB. As shown in database 200, custB sold 60 units of crayons and folders (stationary) to Store-B in New Jersey on September 16. This information semantically defines custB as a wholesaler who is currently providing large shipments of stationary supplies to stores in New Jersey. This semantic information is converted into a semantic index "21", which is defined as meeting these criteria within the context shown in row 101, as shown in table 202.

Assume further that the system wants to semantically define custB. For example, and as shown in database 200, custB sold 100 units of bananas and oranges (fresh produce) to Store-A in Connecticut on October 16. This information semantically defines custC as a wholesaler who is currently providing large shipments of fresh produce to stores in Connecticut. This semantic information is converted into a semantic index "26", which is defined as meeting these criteria within the context shown in row 102, as shown in table 202.

Since the semantic index for custA (25) is very close to the semantic index for custC (26), then the system understands that custA and custC are very similar types of operations. As such, when a query search is made on a database (e.g., database 200) for wholesalers that are actively/currently selling fresh produce to stores in the United States Northeast, the query will use a lookup table that identifies wholesalers with a semantic index between 24 and 27 as being fresh produce wholesalers in the United States Northeast. This lookup table allows the system to search for any semantic indexes in this range (e.g., 25 and 26 shown in index 204), which allows the system to go directly to rows 100 and 102 according to the information found in index 204.

In one or more embodiments of the present invention, the present database embedding model generates an inverse index using a tokenID (e.g., the semantic index 25) and rowID (e.g., 100 in database 200). This semantic indexing provides a fast and scalable way of semantically linking two rows 100 and 102 from database 200 by organizing tuples (tokenID, rowID), so that the appropriate customers (e.g., custA and custC) can be accessed quickly when searching for entities that wholesale fresh produce in the Northeast area of the United States of America.

In one or more embodiments of the present invention, a semantic index is generated for: (1) all values in a table, (2) values in a user-specified relational column in the table, (3) one or more columns in the table, and/or (4) one or more rows in the table.

For example, in the table shown as database 200 shown in FIG. 2, semantic indexes are generated for each value in each row of the database 200.

That is, besides (or instead of) generating a semantic index that uses the information in a row on database 200 to describe a particular customer (e.g., custA), another semantic index is generated that information in the same row to describe transactions that occur on a particular date (e.g., 9/16); activities for a particular type of merchant (e.g., Store-A); what type of commerce is occurring in a particular state (e.g., NY); what type of commerce occurs by a particular store and/or its supplier (e.g., Fresh Produce); what particular products are being sold (e.g., bananas and apples) and in what quantity (e.g., 200), etc.

Thus, information from each column is semantically defined/described according to other information from a corresponding row. Date information such as "9/16" by itself is meaningless. However, when semantically combined with other information (NY, Fresh Produce, Bananas and Apples, 200), then "9/16" semantically has a semantically specific meaning (wholesale of fresh product to merchants) in New York on September 16. However, when "9/16" is semantically combined with other information (NJ, Stationary, Crayons and Folders, 60), then it has a different semantic meaning (wholesale of stationary supplies to merchants in New Jersey on September 16).

As such, given a key value (e.g., information from one of the cells in the database 200), the semantic index will return a set of (token-id, row-id) that correspond to rows with semantically similar values in a table or of the user-specified column in the table.

That is, semantically similar items will share a numeric value for their semantic index that is used as the identifying key for building the index 204.

In one or more embodiments of the present invention, all tuples that share a key (e.g., semantic indexes within a same range) are collated together in a group, such that a request for entities within this range are all returned together. For example, if a requester is asking for information about fresh produce sellers in the Northeast area of the United States of America, then custA and custC will be returned, since they have semantic indexes that are close in value (even though they shipped to different states on different dates).

In one or more embodiments of the present invention, a semantic index covers multiple columns or the entire table. In such embodiment(s), tuples within a group are ordered based on the associated column type. For example, if the user is requesting information about customers that shipped any product in September or October, then semantic indexes use a value that includes both September and October, ignores any information related to "State", "Category", "Items", and "Amount", and just uses information about "Date" and "Merchant" to give a semantic meaning to "custID".

In one or more embodiments of the present invention, semantic indexes are generated using Locality Sensitive Hashing (LSH) to build a binary codeword for each vector in the database embedding model. This binary codeword describes two vectors as being in a same bucket, and identifies the name and location of this bucket.

Locality Sensitive Hashing (LSH) hashes similar items into the same "buckets". By placing similar items (e.g., vendors, customers, etc.) in a same bucket, similar items are clustered together using LSH, leading to rapid generation of a self-balancing tree data structure, such as a B-tree.

The system then generates a numerical value (LSH key), also referred to herein as a semantic index, from the binary codeword and uses it as a hash value for locating data. In one or more embodiments of the present invention, multiple vectors share the same LSH key.

Once the LSH keys are generated, the system builds an index (e.g., a generalized binary search tree, which in one or more embodiments of the present invention is a B-tree derivative) using (LSH Key, Value) for each tuple (tokenID, rowID) extracted from the inverse index.

At the top levels, tuples are collated in a sorted order based on the LSH Key value, such that for each LSH Key value, tuples can be further ordered based on column type.

Once the index 204 shown in FIG. 2 is generated, it is queried by inputting an input relational entity (e.g., "Store A" of type "Merchant") into a search engine, algorithm, and/or neural network. The vector for this combination is generated, and its LSH key is computed. This generated LSH key is then used to fetch semantically related tokens and corresponding rows using the index 204 shown in FIG. 2.

In one or more embodiments of the present invention, and as described herein, artificial intelligence in the form of a neural network is used to generate and/or utilize semantic indexes.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons in certain electronic neural networks are never technically "inhibitory", but are only "excitatory" to varying degrees. In other electronic neural networks, however, electronic neurons are capable of inhibitory signals, which reduce the ability of a follow-on neuron to produce a positive output.

Figure 3:
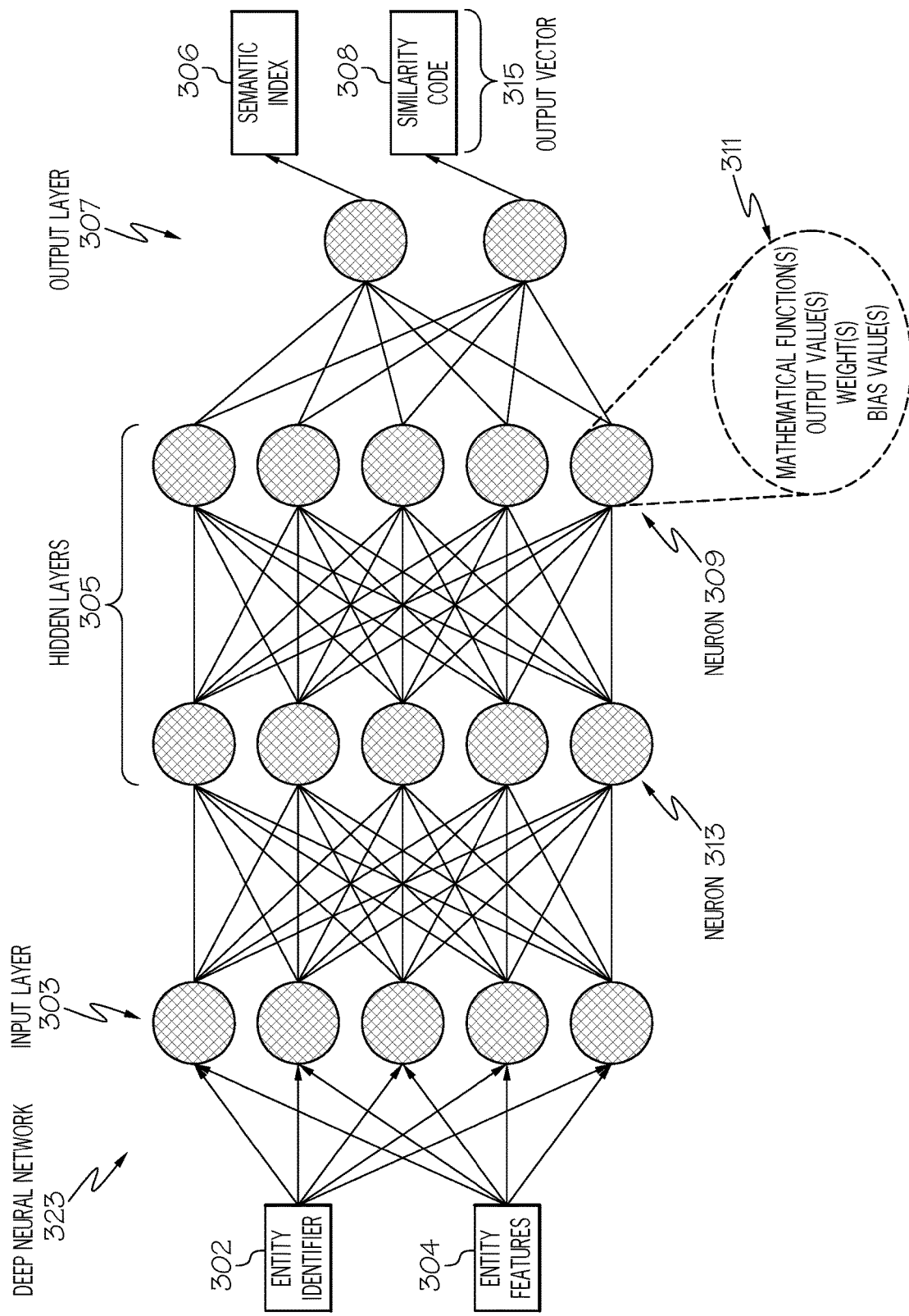
FIG. 3 depicts an overview of a deep neural network (DNN) that is used in one or more embodiments of the present invention to generate semantic indexes and/or similarity codes.

With reference now to FIG. 3, one type of neural network used in one or more embodiments of the present invention is a deep neural network (DNN), such as the depicted deep neural network (DNN) 323 (analogous to the machine learning system 123 shown in FIG. 1), as shown in FIG. 3.

Figure 4:
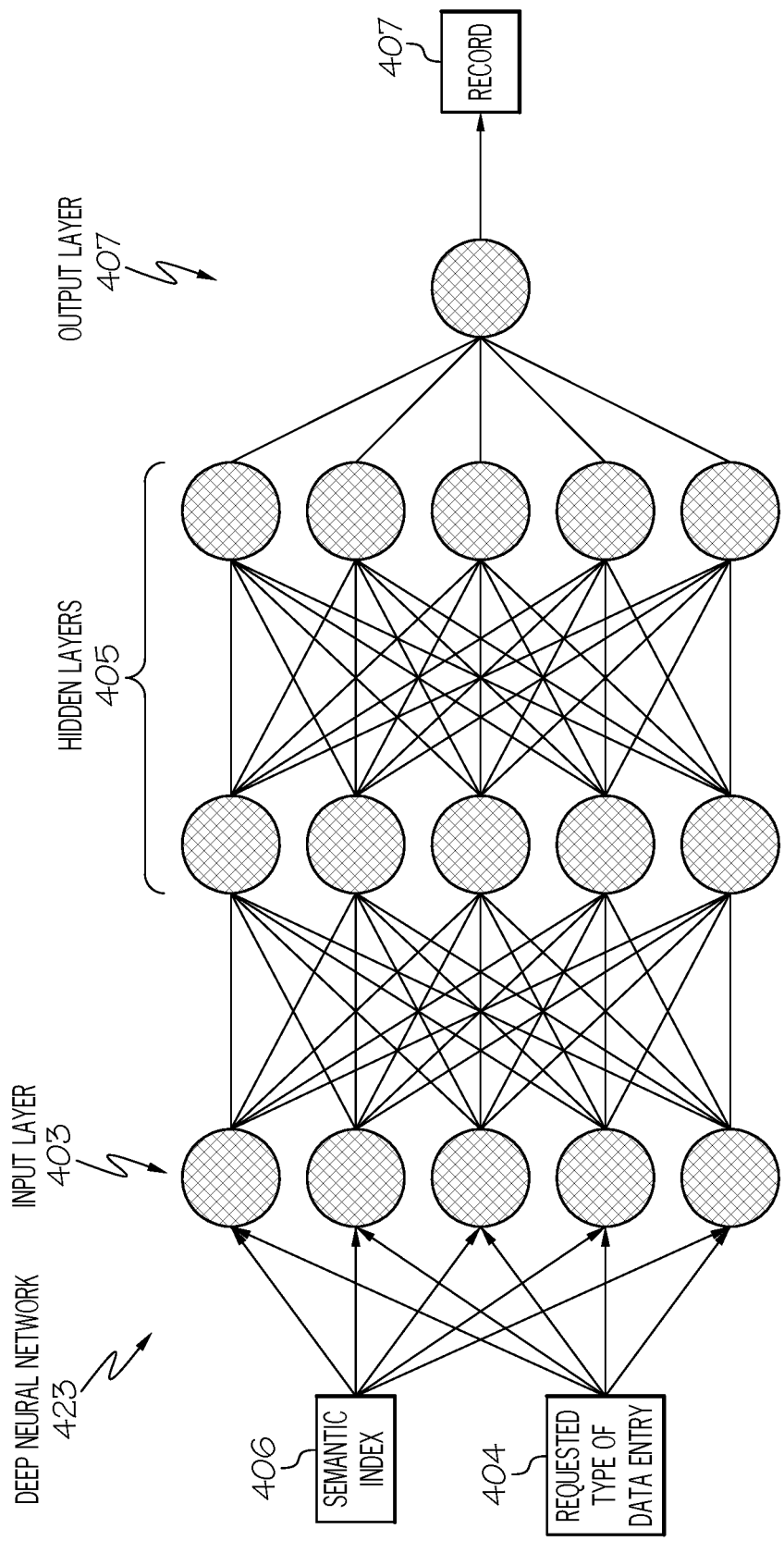
FIG. 4 illustrates an overview of a trained DNN that is used in one or more embodiments of the present invention to locate a particular record from a database using a semantic index and requested type of data entry as inputs.

DNN 323 is used in one or more embodiments of the present invention when generating the semantic index and/or similar row shown in database 200 in FIG. 2. An analogous trained DNN 423 shown in FIG. 4 is used to retrieving a particular data set using the semantic index shown in index 204 in FIG. 2 and/or a requested type of data entry.

In a deep neural network (DNN), neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

As shown in FIG. 3, the electronic neurons in DNN 323 are arranged in layers, known as the input layer 303, hidden layers 305, and an output layer 307. The input layer 303 includes neurons/nodes that take input data, and send it to a series of hidden layers of neurons (e.g., hidden layers 305), in which neurons from one layer in the hidden layers are interconnected with neurons in a next layer in the hidden layers 305. The final layer in the hidden layers 305 then outputs a computational result to the output layer 307, which is often a single node for holding vector information that describes the output vector 315 (e.g., the semantic index 306 and/or similarity code 308). In an embodiment of the present invention, each neuron in the output layer 307 is associated with a particular output vector 315.

As just mentioned, each node in the depicted DNN 323 represents an electronic neuron, such as the depicted neuron 309. Each node can be a processing unit (e.g., a microprocessor, a computer, etc.), another DNN, a convolutional neural network (CNN), a recurrent neural network (RNN), a quantum computer, etc. As shown in block 311, each neuron (including exemplary neuron 309) includes multiple features, such as a mathematical function, an output value, a weight, and a bias value.

The mathematical function is a mathematic formula for processing data from one or more upstream neurons. For example, assume that one or more of the neurons depicted in the middle hidden layers 305 sent data values to neuron 309. Neuron 309 then processes these data values by executing the mathematical function shown in block 311, in order to create one or more output values, which are then sent to another neuron, such as another neuron within the hidden layers 305 or a neuron in the output layer 307. Each neuron also has a weight that is specific for that neuron and/or for other connected neurons. Furthermore, the output value(s) are added to bias value(s), which increase or decrease the output value, allowing the DNN 311 to be further "fine-tuned".

For example, assume that neuron 313 is sending the results of its analysis of a piece of data to neuron 309. Neuron 309 has a first weight that defines how important data coming specifically from neuron 313 is. If the data is important, then data coming from neuron 313 is weighted heavily, and/or increased by the bias value, thus causing the mathematical function (s) within neuron 309 to generate a higher output, which will have a heavier impact on neuron(s) in the output layer 307. Similarly, if neuron 313 has been determined to be significant to the operations of neuron 309, then the weight in neuron 313 will be increased, such that neuron 309 receives a higher value for the output of the mathematical function in the neuron 313.

Alternatively, the output of neuron 309 can be minimized by decreasing the weight and/or bias used to affect the output of neuron 309. These weights/biases are adjustable for one, some, or all of the neurons in the DNN 323, such that a reliable output will result from output layer 307. Such adjustments are alternatively performed manually or automatically.

When manually adjusted, the weights and/or biases are adjusted by the user in a repeated manner until the output from output layer 307 matches expectations. For example, assume that DNN 323 is being trained to generate a particular semantic index 306 and/or similarity code 308. As such, when input layer 303 receives the inputs from a known entity identifier 302 (e.g., "custA") and/or entity features 304 (e.g., other entries from a database row or equivalent on which custA is located, as shown in FIG. 2), then DNN 323 (if properly trained by manually adjusting the mathematical function(s), output value(s), weight(s), and biases in one or more of the electronic neurons within DNN 323) outputs a correct output vector 315 to the output layer 307.

When automatically adjusted, the weights (and/or mathematical functions) are adjusted using "back propagation", in which weight values of the neurons are adjusted by using a "gradient descent" method that determines which direction each weight value should be adjusted to.

With reference now to FIG. 4, a DNN 423 (analogous to machine learning system 123 shown in FIG. 1) has been trained, in a manner described above for DNN 323 in FIG. 3. The trained DNN 423 uses a semantic index 406 and a requested type of data entry 404 (e.g., a particular customer) as inputs, runs that input through an input layer 403 and hidden layers 405, and creates a vector in output layer 407 that described a particular record 407 (e.g., row 100 shown in FIG. 2) in a database (e.g., database 200 shown in FIG. 2) that meets the features of the semantic index 406 and the requested type of data entry 404 (e.g., a particular customer custA).

Thus, one or more embodiments of the present invention enable searches for data that meet certain semantic meanings (e.g., a particular type of wholesaler in a certain geographical area).

While one or more embodiments of the present invention are described herein as using data directly from the database 200 shown in FIG. 2, in one or more embodiments of the present invention entities (entries) in a relational table such as database 200 are first converted into temporary text format for training, and vectors are derived from such temporary text formats for use as a key for indexing. A process for using such text format-based indexing is shown in FIG. 5.

Figure 5:
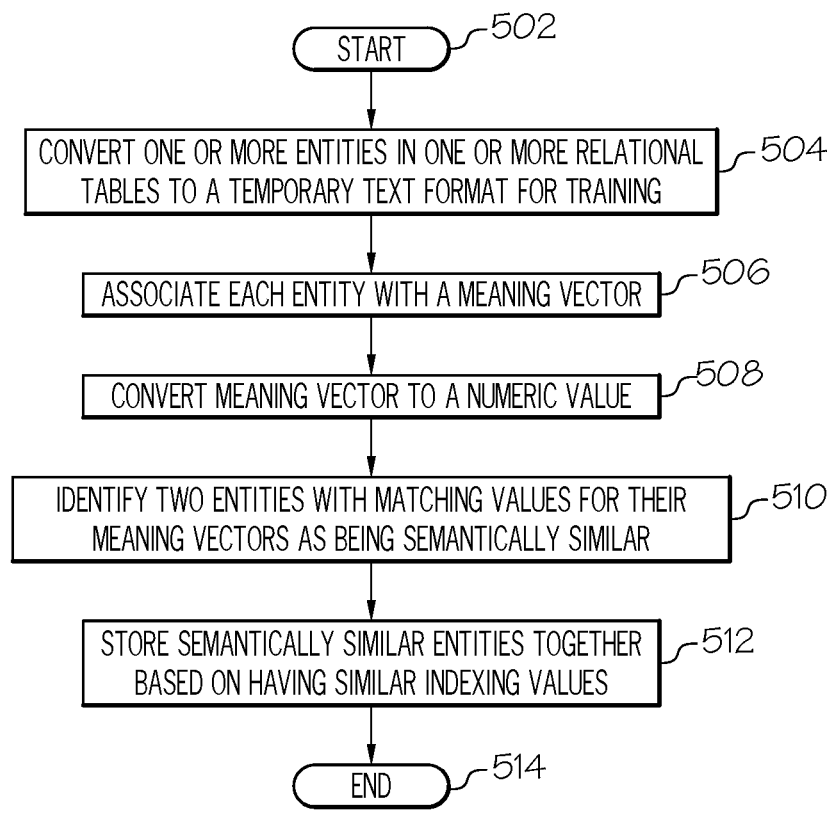
FIG. 5 is a high-level flow-chart of one or more operations performed in one or more embodiments of the present invention.

With reference now to FIG. 5, after initiator block 502, entities in relational tables (e.g., the entry custA and/or Store-A and/or Fresh produce etc. from table 200) are converted to a temporary text format for training, as shown in block 504. That is, exemplary custA and/or Store-A and/or Fresh produce etc. are converted into a single text format (e.g., a phrase, sentence, etc.). In one or more embodiments of the present invention, each string of text is specific for a particular entry in the relational table. For example, custA will have its own text string of certain entries in the table 200. In one or more embodiments, these certain entries are from a same row as custA, while in one or more other embodiments, these certain entries come from multiple rows, including those that custA is not in, thus giving the system greater flexibility in defining the context of custA.

Figure 6:
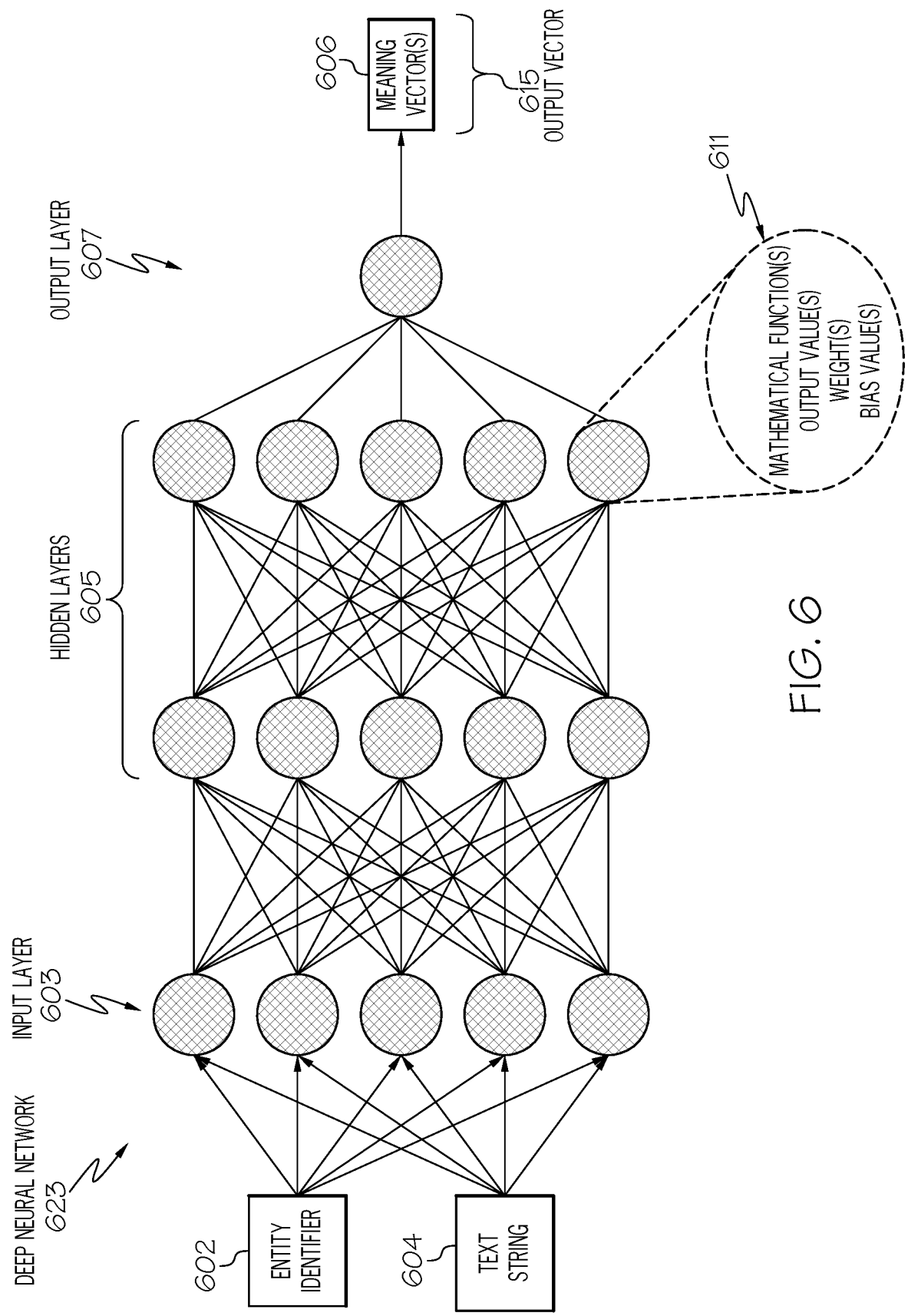
FIG. 6 depicts a DNN being trained with a text string to produce a meaning vector in one or more embodiments of the present invention.
Figure 7:
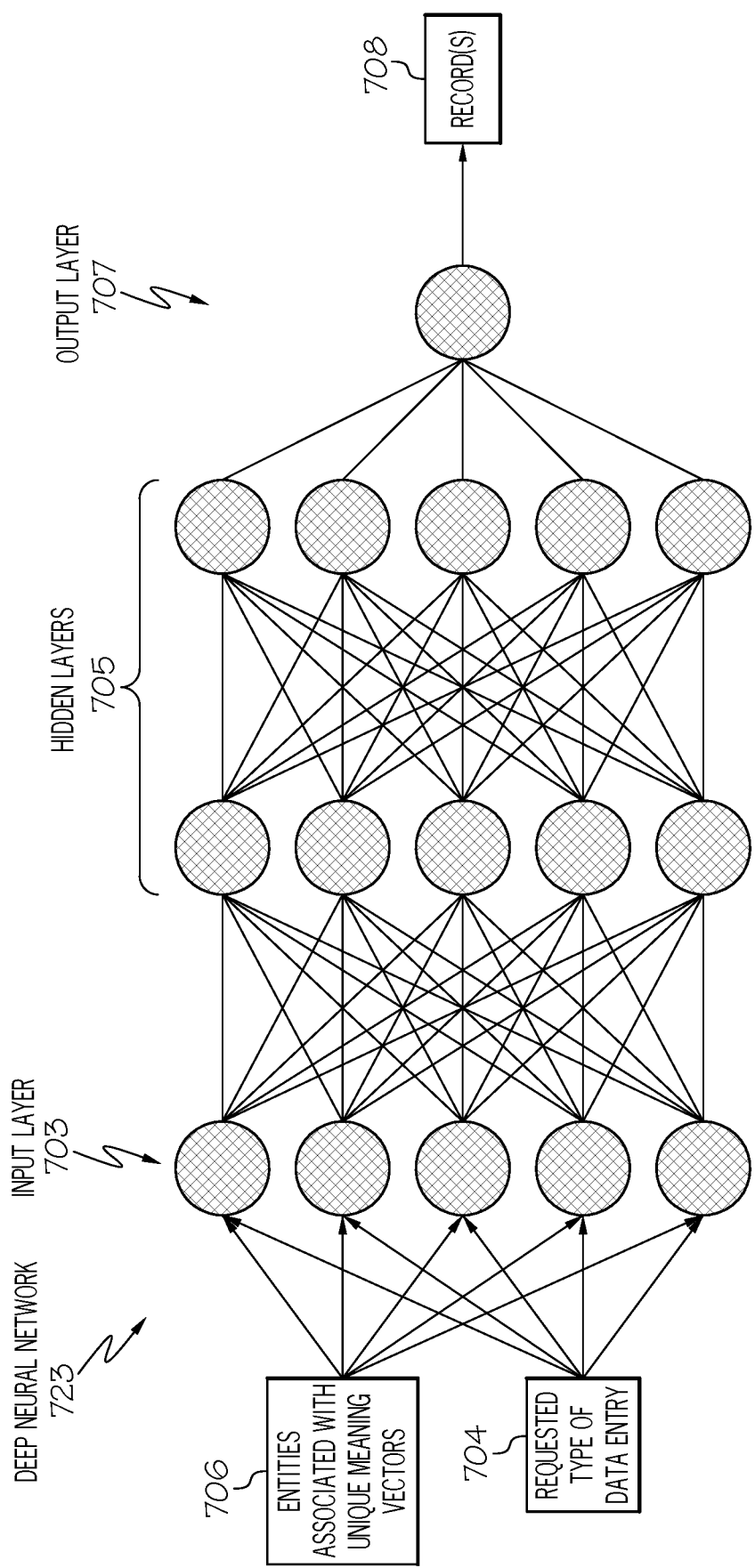
FIG. 7 illustrates the trained DNN from FIG. 6 being used to retrieve data based on a meaning vector in one or more embodiments of the present invention.

Consider now DNN 623 shown in FIG. 6, which is similar in architecture as DNN 323 shown in FIG. 3 (input layer 603, hidden layers 607, output layer 607), but with different mathematical function(s), output value(s), weight(s), and bias value(s) in block 611. The text string 604 derived from entries in the relational table for one or more particular entities/entries from the relational table, and an entity identifier 602 (e.g., a vector derived from and/or associated with a particular entity/entry, such as custA) that identifies these one or more particular entities/entries, is input into DNN 623. DNN 623 is trained using entity identifier 602 and text string 604 for one or more entities/entries to output, in the output vector 615, meaning vector(s) 606, which is associated with a particular semantic meaning for the particular one or more entities identified by the entity identifier 602.

As shown in block 506 in FIG. 5, after training a system (e.g., training DNN 623 from FIG. 6 to create trained DNN 723 shown in FIG. 7, which includes input layer 703, hidden layers 705, and output layer 707 that are analogous to input layer 603, hidden layers 607, output layer 607 in DNN 623 shown in FIG. 6), each entity is associated with a meaning vector. For example, an entity custB is associated with a meaning vector that describes certain elements from table 200 that are associated semantically with what custB's features are.

As shown in block 508 in FIG. 5, the meaning vector is converted to a numeric value using Locality Sensitive Hashing (LSH). That is, the meaning vector contains a description of the meaning of a particular one or more entries in the table. This description/meaning vector is then converted into a numeric value, which can be processed by a search system, such as trained DNN 723 shown in FIG. 7. In one or more embodiments of the present invention, this numeric value (i.e., meaning values) is used as a key to be indexed.

As shown in block 510 in FIG. 5, two entities are semantically similar if their "values" (i.e., numeric value of their meaning vectors) are the same or similar (within a predefined range of one another). Thus, in FIG. 7, when a request comes into the system for a particular type of data entry, as defined by its semantic meaning according to its context in a database, that requested type of data entry 704 and entities associated with unique meaning vectors 706 are input into the trained DNN 723. Each of entities associated with unique meaning vectors 706 includes an index that identifies it according to its meaning vector. The requested type of data entry 704 includes a particular meaning vector, which the trained DNN 723 uses to identify one or more specific record(s) 708 that have the same or similar meaning vector.

As shown in block 512 in FIG. 5, in one or more embodiments of the present invention, semantically similar entities are stored together based on having similar indexing values. This allows the system to rapidly return entities that are in a same "bucket" and/or space in physical storage.

The flow chart in FIG. 5 ends at terminator block 514.

Figure 8:
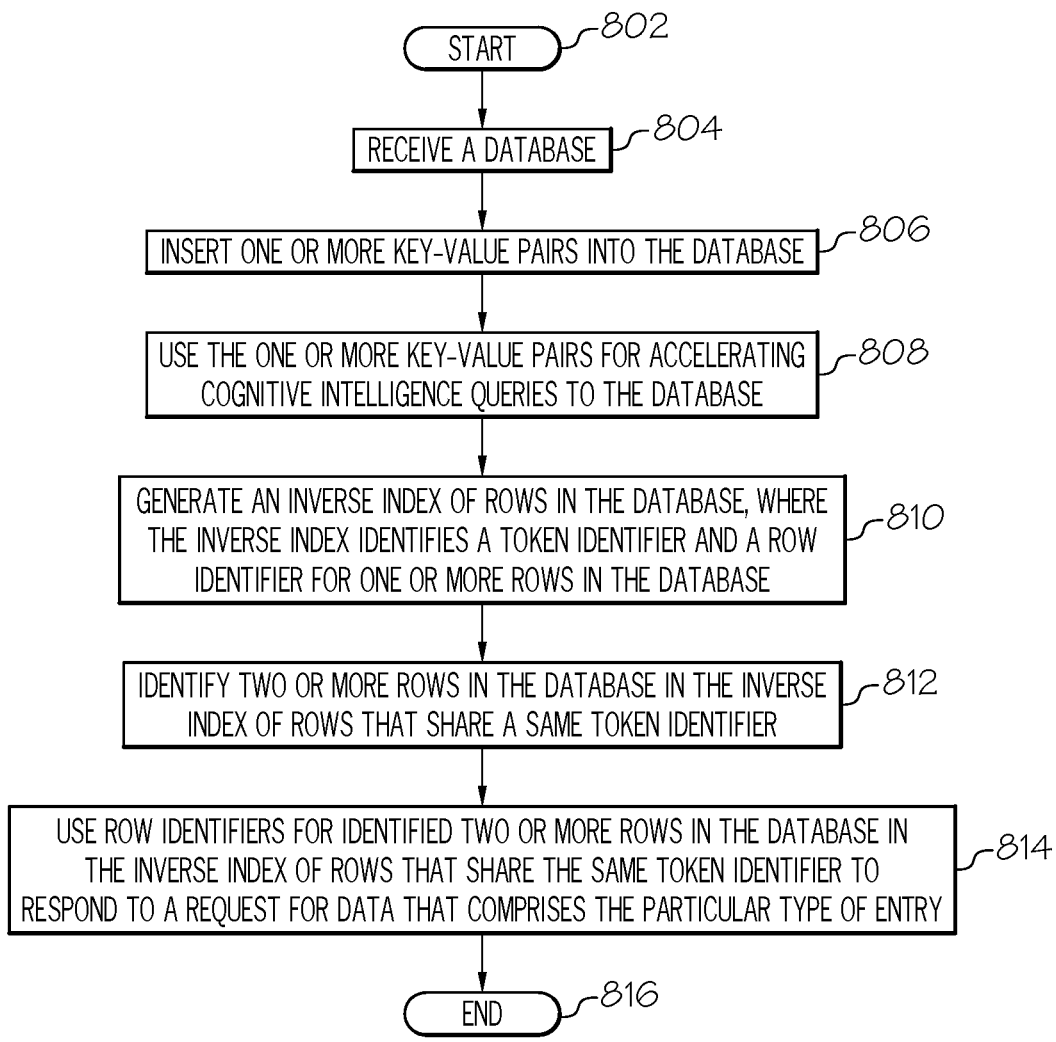
FIG. 8 is a high-level flow-chart of one or more operations performed in another one or more embodiments of the present invention.

With reference now to FIG. 8, a high-level flow-chart of one or more operations performed by a computing device in accordance with in one or more embodiments of the present invention to accelerate cognitive intelligence queries is presented.

After initiator block 802, a computing device receives a database (e.g., database 200 but without the column labeled "Semantic index" and/or the column labeled "Similar row"), as described in block 804.

As described in block 806, the computing device inserts one or more key-value pairs into the database, where the key is a semantic key that is generated from a binary codeword built from a locality sensitive hashing of one or more vectors in a database embedding model of the database, and where the value is a tuple in the database that identifies entries in the database that share predefined features.

Thus, one or more vectors are generated based on one or more values in a row in the database (e.g., database 200, which is used to create an exemplary database embedding model). For example, a vector can be generated from the values "Fresh produce" (e.g., represented as a vector such as "111"). These vector(s) are then used to build binary codewords, which semantically describe a feature found in a row (e.g., a binary codeword "010" which is used to describe a wholesaler of fresh produce). In one or more embodiments of the present invention, the binary codewords are built using locality sensitive hashing (LSH), which results in similar vectors being conceptually put into same buckets.

That is, LSH builds a binary codeword for each vector, indicating whether two vectors are similar (in the same bucket), as shown in database 200 as having a "Similar row". A LSH key is a value of the binary codeword, and is used as a hash value, such that multiple vectors can share a same LSH key. By using LSH keys and their respective values, an index (e.g., index 204 shown in FIG. 2) is built showing each tuple (tokenID, rowID), such that tuples are collated in a sorted order based on the LSH kay value. Thus, for each LSH key value, tuples can be further ordered based on column types in the database.

As such, the semantic key plus its value define the semantic indexes shown in FIG. 2.

As described in block 808, the computing device uses the one or more key-value pairs for accelerating cognitive intelligence queries to the database, by using the table 202 and/or index 204 shown in FIG. 2.

As described in block 810, in one or more embodiments of the present invention the computing device generates an inverse index of rows in the database (e.g., index 204 shown in FIG. 2). The inverse index identifies a token identifier and a row identifier for one or more rows in the database. The token identifier identifies a particular type of data entry according to a semantic index of a particular row in the database. The row identifier identifies a particular row in the database that includes the particular type of data entry.

As described in block 812, the computing device identifies two or more rows in the database in the inverse index of rows that share a same token identifier (e.g., have a similar semantic index and describe a same type of entity, such as "customer").

As described in block 814, the computing device uses row identifiers for identified two or more rows in the database in the inverse index of rows that share the same token identifier to respond to a request for data that comprises the particular type of entry. That is, the semantic index shown in index 204 directs the search algorithm to the row(s) of entries that have similar semantic indexes (within a predefined range of one another) in order to respond to the request.

Thus, by inputting a relational entity (e.g., "Store-A" of type "Merchant"), the system first fetches the vector that describes "Store-A", and computes its LSH key (which describes "Store-A" as a wholesaler of fresh produce in the Northeastern US). The system uses the LSH key to fetch semantically related tokens (e.g., for custA and custC), as indicated by their similar semantic indexes shown in index 204 in FIG. 2.

The flow chart ends at terminator block 816.

In one or more embodiments of the present invention, the computing device responds to cognitive intelligence queries by: fetching vectors associated with tokens in the database, where each vector describes one or more features of entries in a particular row in the database; and using fetched vectors to fetch semantically related tokens and corresponding rows in response to the cognitive intelligence queries to the database. That is, each entry in a row has a semantic index based on other entries in that same row. Thus, similar entries in a column that are in a same semantic bucket are returned to the query, since they are semantically similar according to their similar vectors being in a same bucket, thus indicating that they have similar semantic indexes.

In one or more embodiments of the present invention, the computing device further builds an index of the database using the semantic key that is a generated from the binary codeword built from the locality sensitive hashing of one or more vectors in the database embedding model of the database, as shown in index 204 in FIG. 2. That is, the semantic key (index) is created from a hashing of binary codeword (e.g., as identified by a B-tree). This semantic key is then used to identify similar meaning entries in the database for retrieval.

Thus, and in one or more embodiments of the present invention, the index is derived from a binary tree describing Hamming distances between the one or more key-value pairs.

In one or more embodiments of the present invention, the computing device directs a physical storage layout of the database embedding model based on the semantic keys. That is, if records (e.g., rows in a database) are semantically similar, then they are stored in physical proximity to one another on a storage medium, in order to accelerate retrieval times for records with similar (within a predefined range of one another) semantic indexes.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
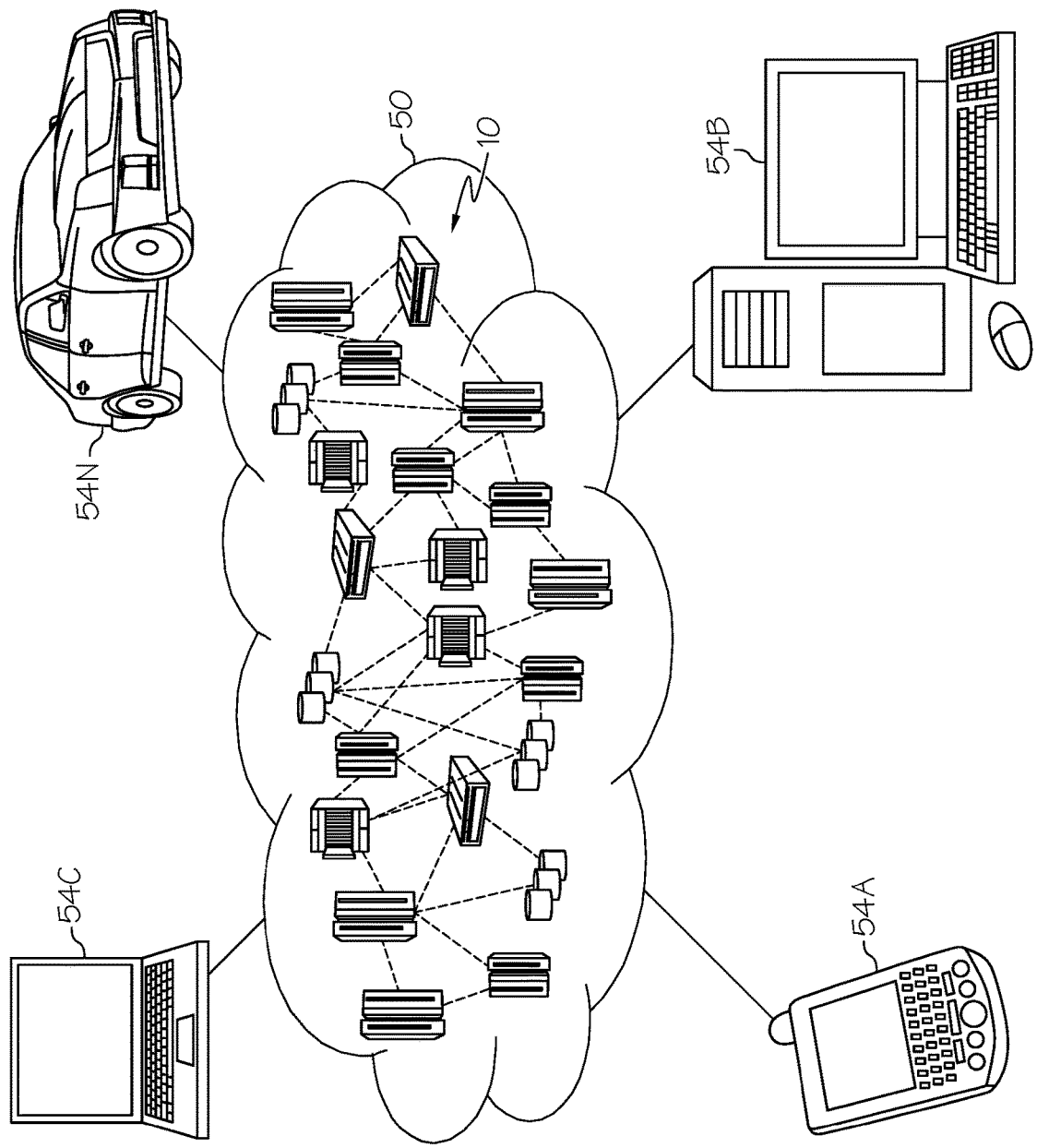
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
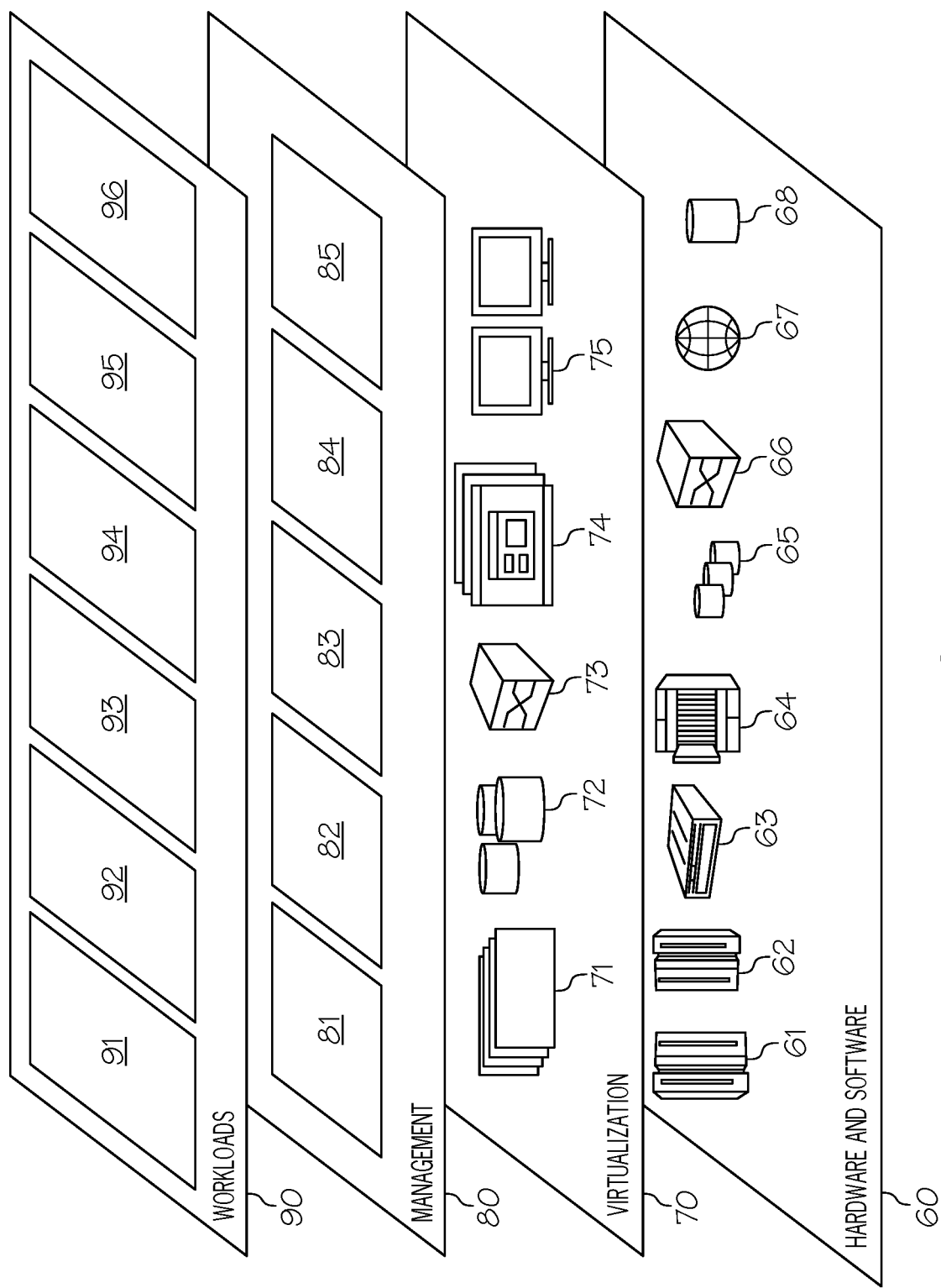
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and semantic query processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of using a computing device to enable and accelerate one or more cognitive intelligence queries, the method comprising:
receiving a database using a program for accelerating semantic queries on databases (PASQD) within the computing device, comprising an embedding table, wherein the embedding table comprises one or more rows, wherein the one or more rows each comprise one or more entities, wherein the one or more entities are each associated with a meaning vector through processing the entities through a trained database embedding model, and wherein the meaning vector comprises a semantic definition of its associated one or more entities;
converting the one or more meaning vectors into one or more semantic keys using locality sensing hashing;
building one or more semantic indexes using the semantic keys, wherein the semantic index comprises one or more tuples, and wherein each of the one or more tuples is a value that identifies one or more entries in the embedding table that share predefined features;
inserting one or more key-value pairs into the embedding table, wherein a key in the one or more key-value pairs is the one or more semantic keys, and wherein a value in the one or more key-value pairs is the one or more tuples; and
using the semantic indexes and an inputted entity to respond to a request to locate the inputted entity upon receiving one or more cognitive intelligence queries, wherein a cognitive intelligence query comprises the request.

2. The method of claim 1, wherein using the semantic indexes and the inputted entity to respond to the request further comprises:
generating an inverse index representing rows in the embedding table, wherein the inverse index comprises a semantic key identifier and a row identifier for the one or more rows in the embedding table, wherein the semantic key identifier identifies one of the one or more entities according to a semantic index of a particular row in the embedding table, and wherein the row identifier identifies a particular row in the embedding table that includes the particular type of data entry;
identifying two or more rows in the embedding table represented by the inverse index of rows that share a same semantic key identifier; and
using row identifiers for the identified two or more rows in the embedding table represented by the inverse index of rows that share the same semantic key identifier to respond to the request.

3. The method of claim 1, wherein using the semantic indexes and the inputted entity to respond to the request further comprises:
fetching one or more meaning vectors associated with the inputted entity;

converting the one or more fetched meaning vectors into one or more fetched semantic keys using locality sensing hashing; and using the fetched semantic keys to fetch semantically related semantic keys and corresponding rows in the embedding table.

4. The method of claim 1, wherein converting the one or more meaning vectors into the one or more semantic keys further comprises:

building binary codewords for each of the meaning vectors generating the one or more semantic keys from each binary codeword.

5. The method of claim 4, wherein the one or more semantic indexes are derived using value-based index structures.

6. The method of claim 4, further comprising:

determining that one or more rows in the embedding table are semantically similar to each other based on the one or more semantic keys; and redirecting storage of the one or more rows in the embedding table that are determined to be semantically similar to each other, wherein the redirecting comprises storing the one or more rows in physical proximity to one another within the embedding table, and wherein as a result of the redirecting, retrieval times for the one or more rows are accelerated.

7. A computer program product for enabling and accelerating one or more cognitive intelligence queries, wherein the computer program product comprises a non-transitory computer readable storage device having program instructions embodied therewith, the program instructions readable and executable by a computer to perform a method comprising:

receiving a database using a program for accelerating semantic queries on databases (PASQD) within the computing device, comprising an embedding table, wherein the embedding table comprises one or more rows, wherein the one or more rows each comprise one or more entities, wherein the one or more entities are each associated with a meaning vector through processing the entities through a trained database embedding model, and wherein the meaning vector comprises a semantic definition of its associated one or more entities;

converting the one or more meaning vectors into one or more semantic keys using locality sensing hashing;

building one or more semantic indexes using the semantic keys, wherein the semantic index comprises one or more tuples, and wherein each of the one or more tuples is a value that identifies one or more entries in the embedding table that share predefined features;

inserting one or more key-value pairs into the embedding table, wherein a key in the one or more key-value pairs is the one or more semantic keys, and wherein a value in the one or more key-value pairs is the one or more tuples; and using the semantic indexes and an inputted entity to respond to a request to locate the inputted entity upon receiving one or more cognitive intelligence queries, wherein a cognitive intelligence query comprises the request.

8. The computer program product of claim 7, wherein using the semantic indexes and the inputted entity to respond to the request further comprises:

generating an inverse index representing rows in the embedding table, wherein the inverse index identifies a semantic key identifier and a row identifier for the one or more rows in the embedding table, wherein the semantic key identifier identifies a one of the one or more entities according to a semantic index of a particular row in the embedding table, and wherein the row identifier identifies a particular row in the embedding table that includes the one of the one or more entities;

identifying two or more rows in the embedding table represented by the inverse index of rows that share a same semantic key identifier; and using row identifiers for the identified two or more rows in the embedding table represented by the inverse index of rows that share the same semantic key identifier to respond to the request.

9. The computer program product of claim 7, wherein using the semantic indexes and the inputted entity to respond to the request further comprises:

fetching one or more meaning vectors associated with the inputted entity;

converting the one or more fetched meaning vectors into one or more fetched semantic keys using locality sensing hashing; and using the fetched semantic keys to fetch semantically related semantic keys and corresponding rows in the embedding table.

10. The computer program product of claim 7, wherein converting the one or more meaning vectors into the one or more semantic keys further comprises:

building binary codewords for each of the meaning vectors generating the one or more semantic keys from each binary codeword.

11. The computer program product of claim 10, wherein the one or more semantic indexes are derived using value-based index structures.

12. The computer program product of claim 10, wherein the method further comprises:

determining that one or more rows in the embedding table are semantically similar to each other based on the one or more semantic keys; and redirecting storage of the one or more rows in the embedding table that are determined to be semantically similar to each other, wherein the redirecting comprises storing the one or more rows in physical proximity to one another within the embedding table, and wherein as a result of the redirecting, retrieval times for the one or more rows are accelerated.

13. The computer program product of claim 7, wherein the method further comprises:

training the trained database embedding model using text string derived from the one or more entities in the embedding table.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method for enabling and accelerating one or more cognitive intelligence queries, the method comprising:

receiving a database using a program for accelerating semantic queries on databases (PASQD) within the computing device, comprising an embedding table, wherein the embedding table comprises one or more rows, wherein the one or more rows each comprise one or more entities, wherein the one or more entities are each associated with a meaning vector through processing the entities through a trained database embedding model, and wherein the meaning vector comprises a semantic definition of its associated one or more entities;

converting the one or more meaning vectors into one or more semantic keys using locality sensing hashing;

building one or more semantic indexes using the semantic keys, wherein the semantic index comprises one or more tuples, and wherein each of the one or more tuples is a value that identifies one or more entries in the embedding table that share predefined features;

inserting one or more key-value pairs into the embedding table, wherein a key in the one or more key-value pairs is the one or more semantic keys, and wherein a value in the one or more key-value pairs is the one or more tuples; and using the semantic indexes and an inputted entity to respond to a request to locate the inputted entity upon receiving one or more cognitive intelligence queries, wherein a cognitive intelligence query comprises the request.

15. The computer system of claim 14, wherein using the semantic indexes and the inputted entity to respond to the request further comprises:
   generating an inverse index representing rows in the embedding table, wherein the inverse index identifies a semantic key identifier and a row identifier for the one or more rows in the database, wherein the semantic key identifier identifies one of the one or more entities according to a semantic index of a particular row in the embedding table, and wherein the row identifier identifies a particular row in the embedding table that includes the one of the one or more entities;
   identifying two or more rows in the embedding table represented by the inverse index of rows that share a same semantic key identifier; and
   using row identifiers for the identified two or more rows in the embedding table represented by the inverse index of rows that share the same semantic key identifier to respond to the request.

16. The computer system of claim 14, wherein using the semantic indexes and the inputted entity to respond to the request further comprises:
   fetching one or more meaning vectors associated with the inputted entity;
   converting the one or more fetched meaning vectors into one or more fetched semantic keys using locality sensing hashing; and
   using the fetched semantic keys to fetch semantically related semantic keys and corresponding rows in the embedding table.

17. The computer system of claim 14, wherein converting the one or more meaning vectors into the one or more semantic keys further comprises:
   building binary codewords for each of the meaning vectors
   generating the one or more semantic keys from each binary codeword.

18. The computer system of claim 17, wherein the one or more semantic indexes are derived using value-based index structures.

19. The computer system of claim 17, wherein the method further comprises:
   determining that one or more rows in the embedding table are semantically similar to each other based on the one or more semantic keys; and
   redirecting storage of the one or more rows in the embedding table that are determined to be semantically similar to each other, wherein the redirecting comprises storing the one or more rows in physical proximity to one another within the embedding table, and wherein as a result of the redirecting, retrieval times for the one or more rows are accelerated.

20. The computer system of claim 14, wherein the method further comprises:
   training the trained database embedding model using text string derived from the one or more entities in the embedding table.

* * * * *